United States Patent
Dumka

(10) Patent No.: US 11,488,503 B1
(45) Date of Patent: Nov. 1, 2022

(54) SHOPPING CART MAINTENANCE SIGNAL FLAG

(71) Applicant: Jean Dumka, Milford, MI (US)

(72) Inventor: Jean Dumka, Milford, MI (US)

(*) Notice: Subject to any disclaimer, the term of this patent is extended or adjusted under 35 U.S.C. 154(b) by 450 days.

(21) Appl. No.: 16/674,678

(22) Filed: Nov. 5, 2019

Related U.S. Application Data

(60) Provisional application No. 62/756,193, filed on Nov. 6, 2018.

(51) Int. Cl.
*G09F 17/00* (2006.01)
*G07C 5/00* (2006.01)
*B62B 3/14* (2006.01)

(52) U.S. Cl.
CPC .......... *G09F 17/00* (2013.01); *G07C 5/006* (2013.01); *B62B 3/14* (2013.01); *G09F 2017/0075* (2013.01)

(58) Field of Classification Search
CPC . G09F 17/00; G09F 2017/0075; G07C 5/006; B62B 3/14
See application file for complete search history.

(56) References Cited

U.S. PATENT DOCUMENTS

| | | | | |
|---|---|---|---|---|
| 1,259,644 A | * | 3/1918 | Lynam | B60Q 1/34 116/53 |
| 1,348,182 A | * | 8/1920 | Pontiere | B60Q 1/34 116/53 |
| 2,324,614 A | | 7/1943 | Dalton | |
| 2,799,240 A | * | 7/1957 | Andrews | E04H 12/32 D11/166 |
| 2,845,729 A | * | 8/1958 | Herbertp | G09F 23/06 40/531 |
| 2,864,189 A | * | 12/1958 | Campbell | B62B 3/1428 235/1 R |
| 2,888,761 A | * | 6/1959 | Miller | B62B 3/1416 40/658 |
| 3,218,748 A | * | 11/1965 | Hopp | B62B 3/1408 24/453 |
| 3,497,980 A | * | 3/1970 | Wall | B60Q 7/005 428/31 |
| D259,772 S | * | 7/1981 | Huntington | D12/114 |

(Continued)

*Primary Examiner* — Nimeshkumar D Patel
*Assistant Examiner* — Tania Courson
(74) *Attorney, Agent, or Firm* — Goldstein Law Offices, P.C.

(57) ABSTRACT

A maintenance signal flag adapted for use with a shopping cart, the maintenance signal flag comprising a flag member and signal panel hingedly connected to a mounting assembly. The mounting assembly secures the maintenance signal flag to the shopping cart, and flag member pivots between raised and lowered positions to raise the signal panel above the shopping cart. The signal panel displays a maintenance message when raised, indicating the shopping cart is faulty. A user, upon discovering a defect, raises the flag member to create a visual alert which warns other users to avoid the faulty shopping cart and notifies maintenance personnel to service the shopping cart. The maintenance message identifies the specific defect to facilitate efficient inspection. The maintenance signal flag may be retrofitted to existing shopping carts and does not interfere with the ability of the shopping cart to be stacked with other shopping carts.

7 Claims, 8 Drawing Sheets

(56) References Cited

U.S. PATENT DOCUMENTS

| | | | | |
|---|---|---|---|---|
| 4,465,290 | A | * | 8/1984 | Hooley ................. B62B 3/1488 |
| | | | | 280/33.996 |
| 4,986,209 | A | | 1/1991 | Spica |
| 5,540,181 | A | | 7/1996 | Pearce |
| 5,548,911 | A | * | 8/1996 | Myers .................... G09F 23/06 |
| | | | | 224/277 |
| D409,937 | S | * | 5/1999 | Aigner ..................... D10/109.1 |
| 6,014,942 | A | * | 1/2000 | Perka ..................... G09F 17/00 |
| | | | | 116/319 |
| 6,584,927 | B1 | | 7/2003 | Iversen et al. |
| 6,880,652 | B2 | | 4/2005 | Holtan et al. |
| 7,905,040 | B2 | * | 3/2011 | Alterman .................. G09F 7/22 |
| | | | | 116/DIG. 1 |
| D672,264 | S | * | 12/2012 | Ochoa ....................... D10/109.1 |
| 8,430,052 | B2 | | 4/2013 | Nihra et al. |
| D688,310 | S | * | 8/2013 | Mauris .......................... D20/18 |
| 8,930,065 | B2 | * | 1/2015 | Argue .................... G07C 5/006 |
| | | | | 701/31.7 |
| 8,998,218 | B1 | * | 4/2015 | Bitondo ................ B62B 3/1488 |
| | | | | 280/33.992 |
| 9,373,198 | B2 | | 6/2016 | Argue et al. |
| 9,472,130 | B2 | * | 10/2016 | Sharpe ...................... G09F 7/08 |
| 10,118,635 | B2 | * | 11/2018 | Jones .................... B62B 3/1404 |
| 10,475,321 | B2 | * | 11/2019 | Jones .................... G01J 5/0859 |
| 2006/0244588 | A1 | * | 11/2006 | Hannah ............. G06K 7/10366 |
| | | | | 340/539.13 |
| 2007/0039542 | A1 | * | 2/2007 | Schrauwen ............. G09F 11/30 |
| | | | | 116/313 |
| 2010/0186273 | A1 | * | 7/2010 | Jones ........................ G09F 7/00 |
| | | | | 40/446 |
| 2014/0167960 | A1 | * | 6/2014 | Argue .................. B07C 5/3422 |
| | | | | 340/540 |
| 2018/0174215 | A1 | * | 6/2018 | Medina ............. G06Q 30/0613 |

* cited by examiner

SHOPPING CART MAINTENANCE SIGNAL FLAG

CROSS-REFERENCE TO RELATED APPLICATIONS

This application is a nonprovisional utility application of provisional patent application, Ser. No. 62/756,193 filed in the United States Patent Office on Nov. 6, 2018, claims priority therefrom, and is expressly incorporated herein by reference in its entirety.

TECHNICAL FIELD

The present disclosure relates generally to a safety and maintenance device for a shopping cart. More particularly, the present disclosure relates to a maintenance signal flag operable by a shopping cart user which visually notifies maintenance personnel that the shopping cart is faulty and requires maintenance.

BACKGROUND

Shopping carts supplied by retail stores for transporting shopping goods are indispensable for shoppers who would otherwise be unable to carry the volume and weight of goods typically purchased during a typical shopping trip. However, shopping carts are often poorly maintained because the carts are constantly in use, leading to rapid wear and tear on the components of the shopping cart. Furthermore, shopping carts are constantly in demand, and maintenance personnel responsible for their repair and upkeep are unable to perform inspections to identify which shopping carts must be taken out of service and set aside for repairs or maintenance. Poorly maintained or faulty shopping carts are frequently un-usable and may even be unsafe. Faulty wheels and casters prevent the shopping cart from moving or turning properly, but defective seatbelts or broken metal basket bars constitute safety hazards which may lead to serious injury.

Presently, current practice requires the shopper to bring the faulty shopping cart to the attention of the store staff. However, most shoppers would rather set aside faulty shopping carts and attempt to find a functional shopping cart than go through the delay and inconvenience of reporting the faulty cart. As a result, faulty shopping carts remain intermingled with the pool of functional carts, and often go undetected by the store's maintenance personnel until they are totally nonfunctional and have open and obvious defects.

Examples of flags and pennants for emergency signaling or for improving visibility abound within the prior art. However, these devices are intended for use with motorized vehicles or are intended for other applications which make them ill-suited for installation onto a shopping cart. The prior art further contains electronic diagnostic devices for detecting shopping cart defects. However, these references do not address the particular problem of efficiently discovering and marking faulty shopping carts with minimal disruptions in a busy shopping environment. A need exists for a device which is inexpensive, is non-intrusive and can be retrofitted to existing shopping carts, is simple enough for any user to operate, and which provides a visual alert to shoppers as well as maintenance personnel which identifies particular faults or defects with great specificity.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a device which a user of a shopping cart may employ to visually notify other users and maintenance personnel that the shopping cart is faulty and in need of maintenance. Accordingly, the present disclosure provides a maintenance signal flag which is attached to the shopping cart and has a flag member and signal panel adapted to be raised and lowered by the user. When raised, the signal panel is elevated above the shopping cart by the flag member, and displays a maintenance message which warns other users to avoid using the shopping cart and alerts the maintenance personnel that the shopping cart is faulty and in need of maintenance.

It is another aspect of an example embodiment in the present disclosure to provide a device which visually informs maintenance personnel of the nature of the maintenance issue to reduce inspection times and increase efficiency. Accordingly, the maintenance message identifies the component of the shopping cart in need of maintenance, and the maintenance signal flag has one or more detachable signal panels displaying alternate maintenance messages which attach to the signal panel to replace the original maintenance message. The maintenance signal flag may also have a second flag member to display additional maintenance messages when multiple maintenance issues are present.

It is yet another aspect of an example embodiment in the present disclosure to provide a device which is positioned within the user's reach and does not interfere with the placement of shopping goods within the shopping cart or the ability of the shopping cart to be stacked with other shopping carts. Accordingly, the maintenance signal flag is externally secured to the side of the shopping cart basket towards the basket opening and the basket rear.

It is a further aspect of an example embodiment in the present disclosure to provide a device which can be used to upgrade shopping carts already in service. Accordingly, the present disclosure provides a maintenance signal flag having a mounting assembly which is selectively attachable and is adapted to be secured to any type of shopping cart.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
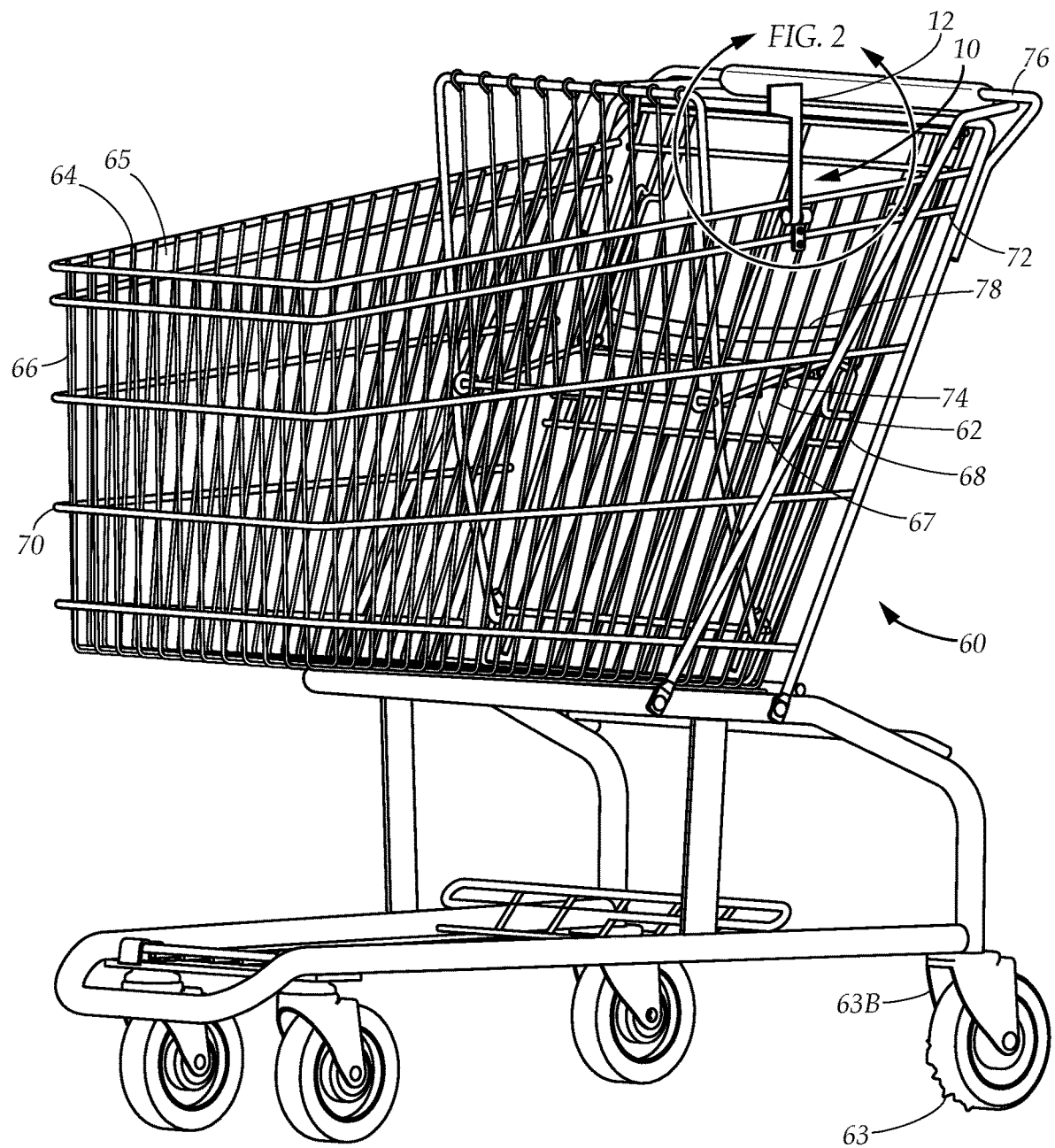
FIG. 1 is a diagrammatical perspective view depicting a shopping cart maintenance signal flag installed on an exemplary shopping cart, in accordance with an embodiment of the present disclosure.
Figure 2:
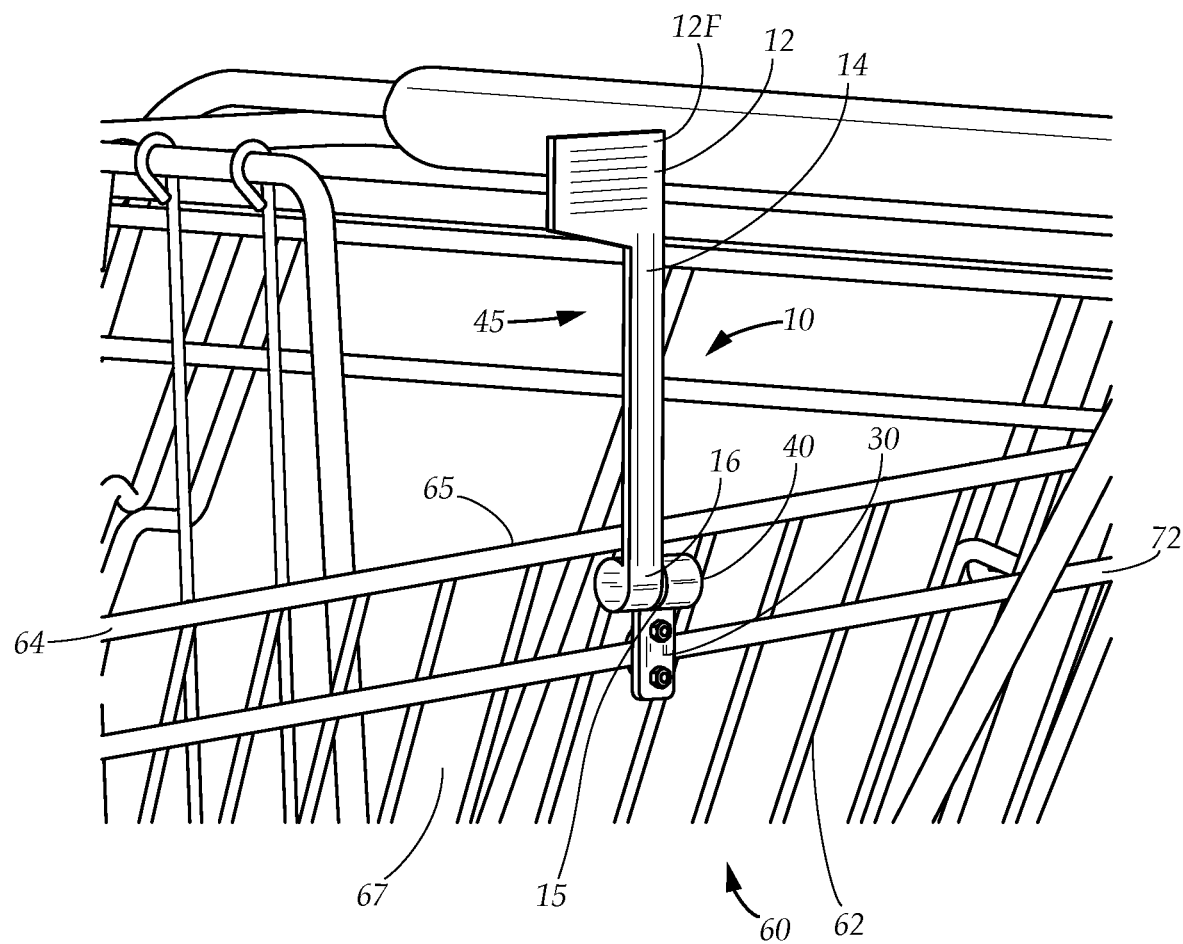
FIG. 2 is a diagrammatical perspective view showing the maintenance signal flag secured to the basket of the shopping cart and placed in a raised position, in accordance with an embodiment of the present disclosure.
Figure 3:
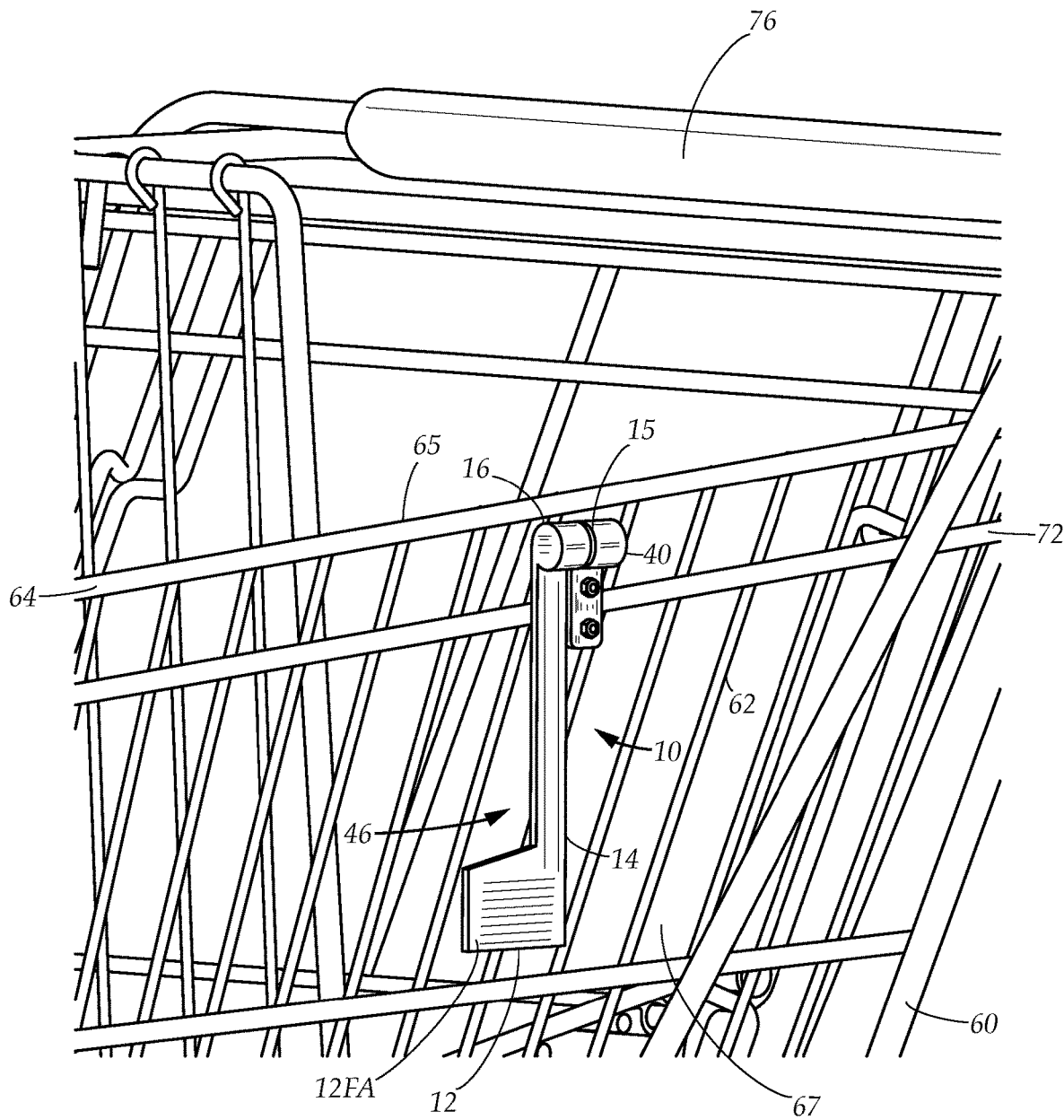
FIG. 3 is a diagrammatical perspective view showing the maintenance signal flag placed in a lowered position, in accordance with an embodiment of the present disclosure.

FIG. 1 illustrates a maintenance signal flag 10 attached to a shopping cart 60, which allows a user, upon encountering defective or faulty components within the shopping cart 60, to signal to other users and/or maintenance personnel that the shopping cart 60 requires maintenance. The other users will be warned to avoid using the faulty shopping cart 60, and the maintenance personnel will be alerted to inspect and service the shopping cart 60. Referring to FIG. 2 while continuing to refer to FIG. 1, the maintenance signal flag 10 comprises a movable flag member 14 having a signal panel 12, and a mounting assembly 30 which is adapted to secure the maintenance signal flag 10 to the shopping cart 60. The maintenance signal flag 10 further comprises a hinge 15 which movably connects the flag member 14 with the mounting assembly 30, and allows the flag member 14 to pivot between a raised position 45 as shown in FIG. 2, and a lowered position 46, as shown in FIG. 3. When the flag member 14 is in the raised position, the signal panel 12 is elevated above the shopping cart 60, placing the signal panel 12 in view of the other users and maintenance personnel. Furthermore, workers gathering unused shopping carts left throughout a store or parking lot will notice the raised signal panel 12 and will not place the faulty shopping carts back into circulation. The maintenance signal flag 10 may be secured to the shopping cart 60 at the time of the shopping cart's manufacture, or may be provided independently for installation to a shopping cart already in service.

Continuing to refer to FIGS. 1-3, the shopping cart 60 is representative of a typical cart or trolley used by shoppers to convey goods, and has components comprising a basket 64, a plurality of wheels 63 and casters 63B positioned beneath the basket 64, and a handle 76. The components of the shopping cart 60 may further include a seat 74 and seatbelt 76 positioned at the rear 68 adapted to receive and secure a seated child. The basket is adapted to receive and hold the goods and has a frame 62 with a front 66, sides 67, a rear 68, and a basket opening 65 which opens upwardly. The frame 62 may be made of any material such as plastic, metal, or a combination thereof. The maintenance signal flag 10 is mounted to one of the sides 67 of the frame 62, preferably within arms' reach of the user as the user stands proximate to the rear 68 of the basket, allowing the user to raise and lower the flag member 14 by hand. In the example depicted, the frame 62 of the exemplary shopping cart 60 is formed from a plurality of welded metal bars 70. In a preferred embodiment, the maintenance signal flag 10 may be mounted to a horizontal bar 72 along the side 67 of the basket 64, positioned proximate to the basket opening 65 and closer to the rear 68 than the front 66 of the basket 64. The maintenance signal flag 10 is not mounted within the basket opening 65 itself, and is instead positioned on an exterior portion of the frame 62, such that the maintenance signal flag 10 does not interfere with the placement of goods within the basket 64. This location also places the maintenance signal flag 10 within the user's reach as the user stands at the rear 68 of the shopping cart 60, and allows the signal panel 12 to be visible to other users when in the raised position. Furthermore, the positioning of the maintenance signal flag 10 on the exterior of the frame 62 towards the rear 68 of the basket 64 does not interfere with the ability of the shopping cart 60 to be stacked with other shopping carts, whereby the rear 68 of the basket is adapted to hingedly open to allow the front 66 of another shopping cart to be inserted therethrough.

Figure 4:
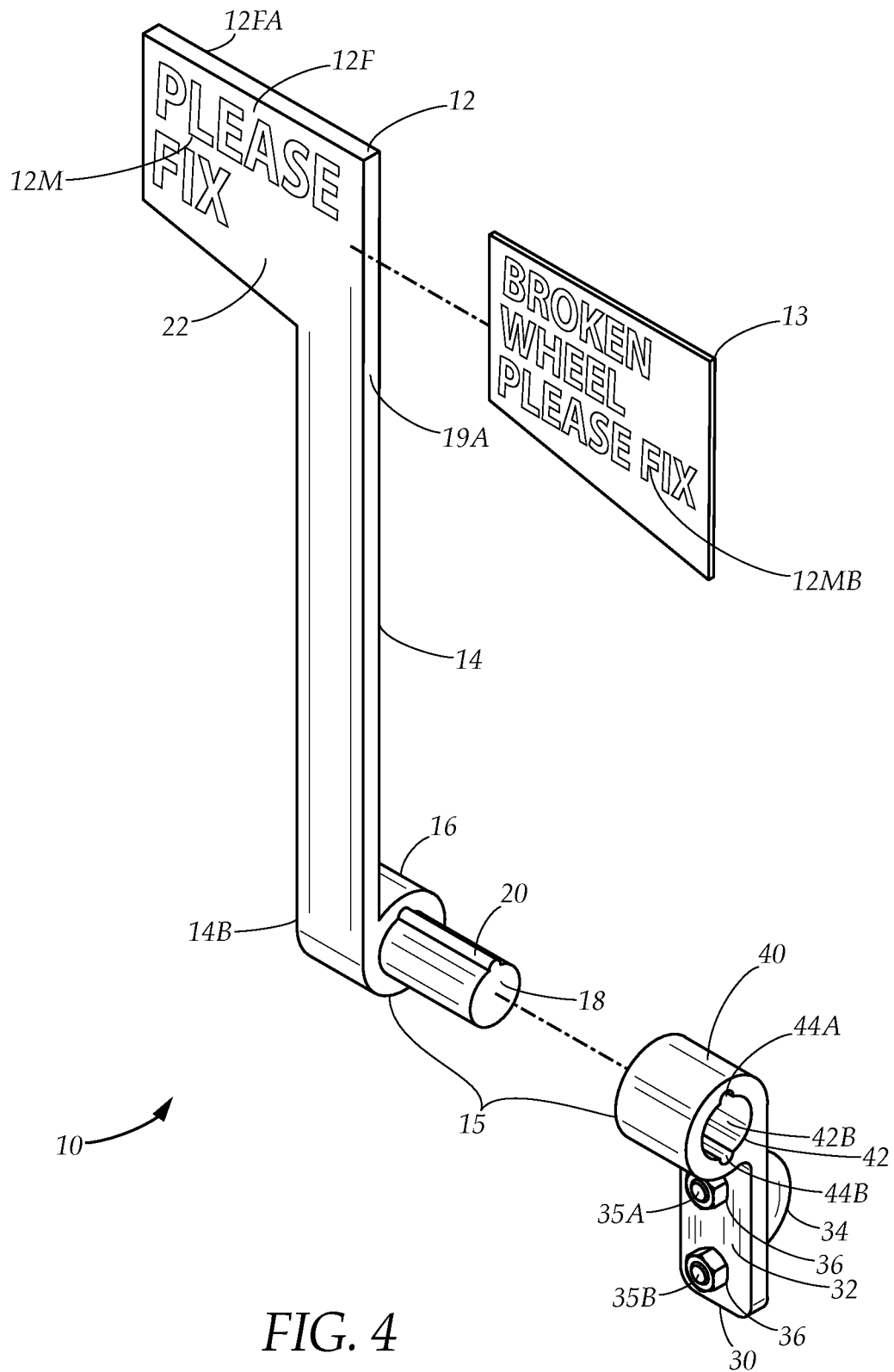
FIG. 4 is an exploded view of the maintenance signal flag, depicting a hinge and a mounting assembly, along with a detachable signal panel, in accordance with an embodiment of the present disclosure.
Figure 5A:
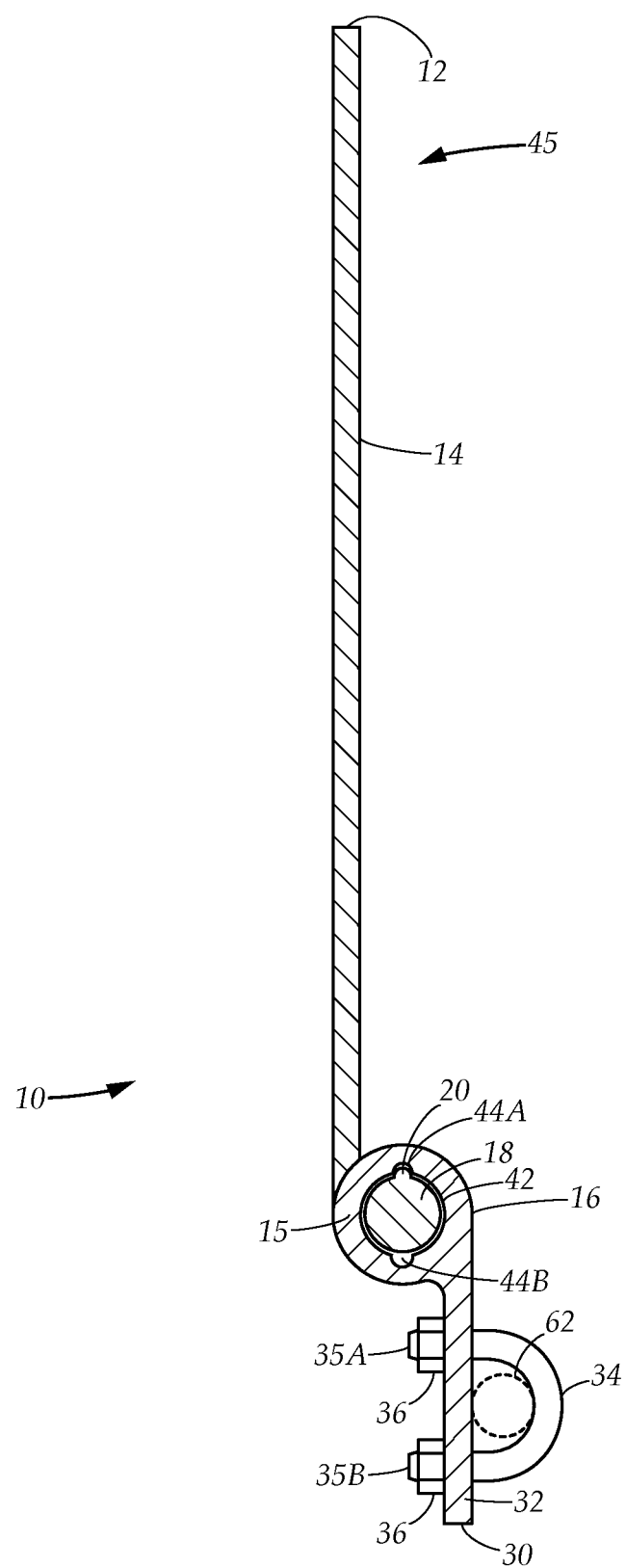
FIG. 5A is a cross section view of the maintenance signal flag, depicting the hinge locked into the raised position, in accordance with an embodiment of the present disclosure.
Figure 5B:
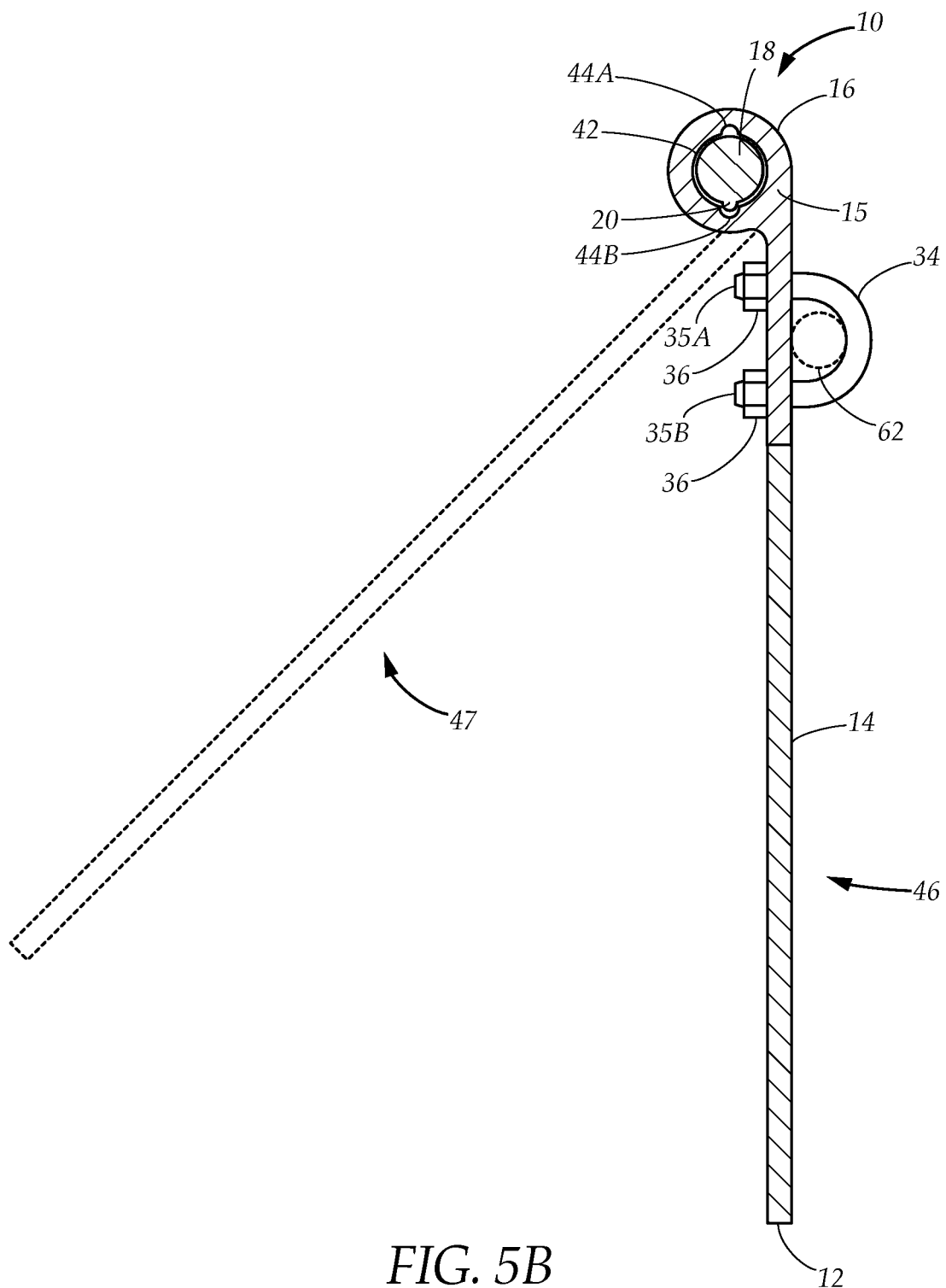
FIG. 5B is a cross section view of the maintenance signal flag, depicting the hinge assembly locked into the lowered position, in accordance with an embodiment of the present disclosure.

Turning now to FIG. 4 while continuing to refer to FIGS. 1-3, the hinge 15, which connects the flag member 14 to the mounting assembly 30, comprises a first hinge component 16 attached to the flag member 14, and a second hinge component 40 attached to the mounting assembly 30. The flag member 14 may be a rod, beam, bar or other narrow and elongated shape having a first end 14A and a second end 14B. The flag member 14 may have a length which is sufficient to elevate the signal panel 12 above the shopping cart 60 and all of its components. The first hinge component 16 and the signal panel 12 are positioned at the first end 14A and the second end 14B respectively. Referring to FIGS. 5A-B while continuing to refer to FIGS. 1 and 4, the first hinge component 16 may have a cylinder 18 disposed perpendicularly to the flag member 14, while the second hinge component 40 may have a hinge opening 42 adapted to receive the cylinder 18 so that it may rotate therein and allow the flag member 14 to pivot between the raised and the lowered positions 45, 46. The hinge 15 may further be adapted to allow the flag member 14 to lock into the raised and lowered positions. In a preferred embodiment, the hinge opening 42 has a hinge opening inner surface 42B which is adapted to surround the cylinder 18 and has a first notch 44A and a second notch 44B. The first and second notches 44A, 44B are arranged parallel with and opposite to each other. The cylinder 18 has a locking projection 20 which is designed to selectively align with and engage either the first or the second notch 44A, 44B when the cylinder 18 is inserted into the hinge opening 42. Rotating the cylinder 18 within the hinge opening 42 causes the locking projection 20 to disengage from either the first or the second notch 44A, 44B, and then engage with the opposite notch as appropriate. While the locking projection 20 is engaged with either the first or the second notch 44A, 44B, the engagement creates a resistive force which prevents the cylinder 18 from rotating, until the user applies sufficient force to overcome the resistive force. In a preferred embodiment, the flag member 14 is in the raised position 45 when the locking projection 20 is engaged with the first notch 44A, and is in the lowered position 46 when engaged with the second notch 44B. Once the flag member 14 is fully lowered and the locking projection 20 engages with the second notch 44B, the flag member is adjacent to and substantially coplanar with the mounting plate 32, minimizing the thickness of the maintenance signal flag 10 and further preventing it from interfering with the normal usage of the shopping cart 60.

Note that the disposition of the cylinder 18 and the hinge opening 42, along with the first and second notches 44A, 44B and the locking projection 20, may be reversed so that the cylinder 18 projects from the second hinge component 40 of the mounting assembly 30, and the hinge opening 42 is positioned within the first hinge component 16 of the flag member 14. In certain embodiments, the hinge 15 may further have a spring mechanism which compresses and locks when the flag member 14 is placed in the lowered position, but is also adapted to automatically push the flag member 14 to the raised position once the spring is released. A person of ordinary skill in the art in the field of the invention will appreciate that the hinge 15 may alternatively be implemented using any alternative structure or means commonly employed to provide hinged or pivoting motion.

Continuing to refer to FIGS. 1-4 and FIGS. 5A-B, in a preferred embodiment, the flag member 14 is raised and lowered along a path 47 which is perpendicular to the side 67 of the basket 64. Note that the path 47 is not intended to be limiting, and the hinge 15 may alternatively be adapted to raise and lower the flag member 14 between the raised and lowered positions along a path which is coplanar to the side 67, or which is otherwise irregular, depending on the nature of the hinge 15.

The signal panel 12 has a signal panel face 12F which is adapted to display a maintenance message 12M which alerts the maintenance personnel that the shopping cart requires maintenance. The maintenance message 12M may be a general statement such as "Please Fix", or a more specific statement which indicates which component of the shopping cart requires maintenance, such as "Broken Wheel". The signal panel 12 may also have a reverse signal panel face 12FA disposed opposite the signal panel face 12F, which allows the maintenance message 12M to be visible from two separate directions and fulfills the same purpose as the signal panel face 12F. In certain embodiments, the maintenance signal flag 10 may have a movable or detachable signal panel 13 displaying an alternate maintenance message 12MB, which is adapted to be selectively attached and detached to the signal panel face 12F and/or the reverse signal panel face 12FA via magnets, clips, adhesive, or other fastening means. The alternate maintenance message 12MB may be used to indicate that a different component of the shopping cart 60, other than the component described in the maintenance message 12M, is in need of maintenance. Furthermore, in certain embodiments, the flag member 14, the signal panel face 12F, and/or the detachable message panel 13 may be covered in a reflective layer to increase the visibility of the maintenance signal flag when exposed to light. The maintenance message 12M may be printed or otherwise overlaid directly on top of the reflective layer.

Referring to FIGS. 1, 4, and 5A-B, the mounting assembly 30 has a mounting plate 32 which is connected to the second hinge component 40. The mounting plate 32 is substantially flat and is adapted to be attached to the frame 62 of the basket 64. In a preferred embodiment, the mounting assembly 30 further has a locking hook 34 which is substantially "U" shaped and has a first hook end 35A and a second hook end 35B. The mounting plate 32 has two locking holes 36 which allow the first and second hook ends 35A, 35B to pass therethrough. In order to attach the mounting plate to the side 67 of the frame 62, the locking hook 34 is removed from the locking holes 36 and is positioned such that the horizontal bar 72 is contained between the first and second hook ends 35A, 35B. The mounting plate 32 is then positioned to bring the first and second hook ends 35A, 35B in alignment with the locking holes 36, until the first and second hook ends 35A, 35B pass through the locking holes 36 and horizontal bar 72 is securely locked in place between the locking hook 34 and the mounting plate 32. The first and second hook ends 35A, 35B may be secured to the mounting plate 32 using nuts or other fastening means. Furthermore, the mounting plate 32 is positioned parallel with the side 67 of the basket 64, and the hinge 15 is adapted to provide the flag member 14 with one hundred and eighty degrees of motion between the raised and the lowered positions 45, 46. Note that in an alternative embodiment, the mounting plate 32 and the locking hook 34 may be adapted to be secured to any bar within the frame 62, such as a vertically oriented bar. In another embodiment where the side 67 of the basket 64 is substantially solid and flat, the mounting plate 32 may simply be directly attached to the side 67 of the basket 64 via fastening means such as adhesives or screws. In an embodiment where the maintenance signal flag 10 is preinstalled on the shopping cart 60 at the time of its manufacture, the mounting plate 32 may be permanently attached to the basket 64 using welding, permanent adhesives, and the like.

Figures 6A, 6B:
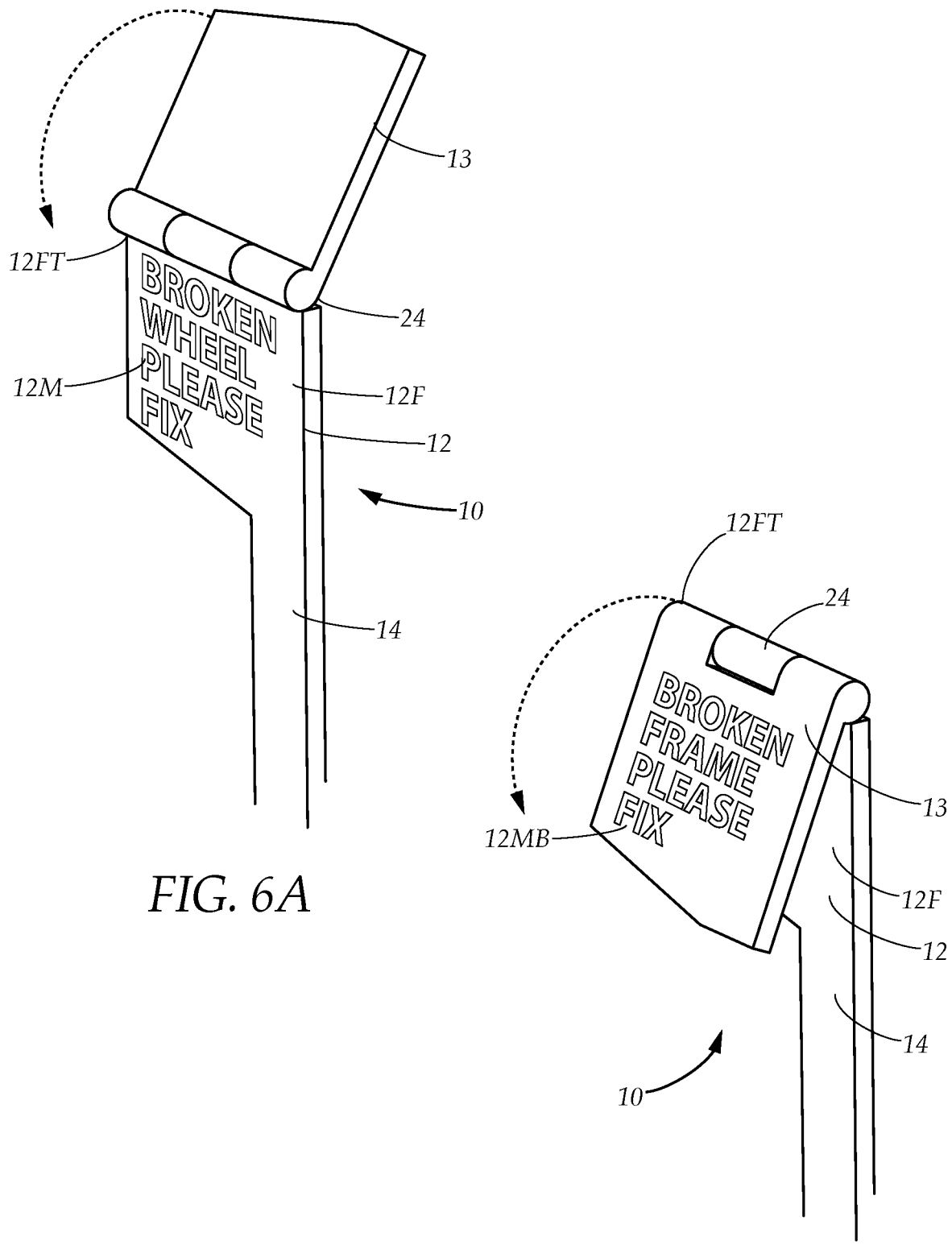
FIG. 6A is a diagrammatical perspective view of the maintenance signal flag with a detachable signal panel hingedly connected to the signal panel top edge, in accordance with an embodiment of the present disclosure.
FIG. 6B is a diagrammatical perspective view of the maintenance signal flag and the hingedly connected detachable signal panel, whereby the detachable signal panel is flipped over the signal panel top edge to cover the signal panel face, in accordance with an embodiment of the present disclosure.

Turning now to FIGS. 6A-B while also referring to FIGS. 1 and 4, the detachable signal panel 13 is movably attached to the signal panel 12. The detachable signal panel 13 may, in certain embodiments, be hingedly attached to a signal panel top edge 12FT by means of a top hinge 24 which allows the detachable signal panel 13 to be flipped to selectively contact either the signal panel face 12F or the reverse signal panel face 12FA. The user may selectively flip the detachable signal panel 13 to display either the maintenance message 12M or the alternate maintenance message 12MB in order to inform the maintenance personnel of the specific component of the shopping cart 60 in need of maintenance. For example, the maintenance message 12M displayed on the signal panel face 12F may read "Broken Wheel", indicating that one of the wheels 63 is faulty. On the other hand, the alternate maintenance message 12MB displayed on the detachable signal panel 13 may read "Broken Frame", indicating that the frame 62 of the basket 64 is faulty. The top hinge 24 may be adapted to support multiple detachable signal panels 13 each bearing a different alternate maintenance message 12MB.

Figure 7:
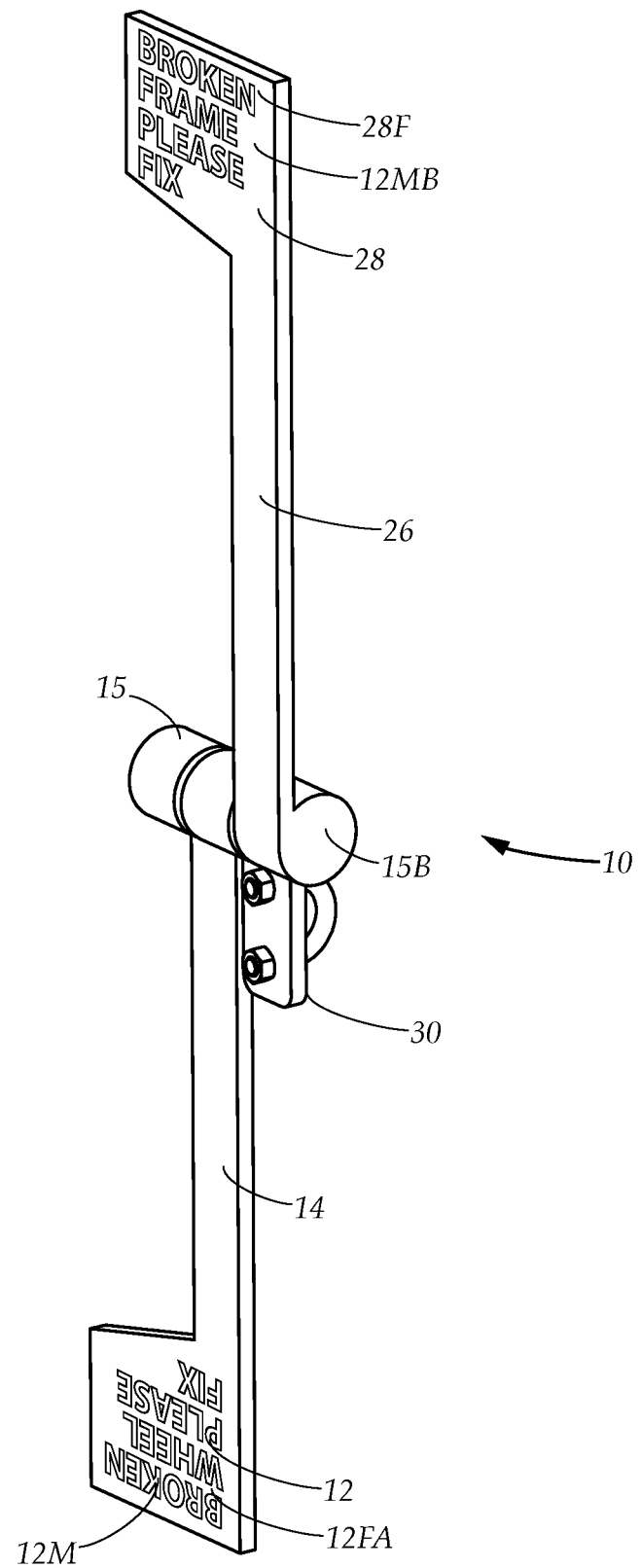
FIG. 7 is a diagrammatical perspective view of an embodiment of the maintenance signal flag with a second flag member, in accordance with an embodiment of the present disclosure.

Referring now to FIG. 7 while also referring to FIGS. 1 and 4, the maintenance signal flag may, in an alternate embodiment, further comprise a second flag member 26 which is substantially similar to the flag member 14 and has a second signal panel 28 and second signal panel face 28F. The second flag member 26 may be connected to the hinge 15 and the mounting assembly 30 via a second hinge 15B in a coaxial arrangement, where the second hinge 15B is disposed opposite the hinge 15 with the mounting assembly 30 positioned therebetween. The alternate maintenance message 12MB may be displayed on the second signal panel face 28F, allowing the user to selectively display either the maintenance message 12M or the alternate maintenance message 12MB by placing either the flag member 14 or the second flag member 26 in the raised position as appropriate. The remaining unused flag member (either the flag member 14 or the second flag member 26) may be placed in the lowered position. In certain cases where the shopping cart 60 has multiple faulty components, all appropriate maintenance messages 12M and/or alternate maintenance messages 12MB may be raised as necessary. Note that as an alternative to the second flag member 26, one or more additional maintenance signal flags may be installed upon the shopping cart 60 proximate to the first maintenance signal flag 10.

The maintenance signal flag 10 may be adapted to display as many unique maintenance messages 12M or alternate maintenance messages 12MB as required to address the maintenance needs of the particular shopping cart 60. In a preferred embodiment, the quantity of maintenance messages 12M and alternative maintenance messages 12MB which can be attached or otherwise displayed from the signal panel face 12F and the second signal panel face 28F, are sufficient to allow the user to notify the maintenance personnel regarding the occurrence of any maintenance issue in a list of common maintenance issues. Accurate notification via the maintenance signal flag 10 reduces the time required for an inspection of the shopping cart and allows the maintenance personnel to more efficiently identify and remedy the relevant maintenance issues. For example, the list of common maintenance issues may comprise faulty wheels 63 or casters 63B, faulty seats 74 or seatbelts 78, faulty basket 64, or the presence of garbage or filth. The list of common maintenance issues may be expanded or reduced as necessary in accordance with the number of components of the shopping cart. For example, some shopping carts do not include baby seats, while others may have additional components such as a coin operated lock.

Referring now to FIG. 1, FIGS. 6A-B, and FIG. 7 simultaneously, a single flag member 14 provided with three additional detachable signal panels 13 is sufficient to display each of the four maintenance issues in the list supplied above. However, at least one detachable signal panel 13 may, in alternate embodiments, be attached to either the signal panel 12 or the second signal panel 28, to greatly increase the number of maintenance messages that can be displayed. A person of ordinary skill in the art in the field of the invention will appreciate that these elements may be employed individually or in combination in furtherance of the principles of the present disclosure.

The maintenance signal flag 10 may alternatively be installed to another position upon the shopping cart 60. For example, referring to FIGS. 1 and 4, the mounting plate 32 may be attached to a part of the shopping cart which connects the handle 76 to the basket 64.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a shopping cart maintenance signal flag. The disclosure is illustrated by example in the drawing figures, and throughout the written description. It should be understood that numerous variations are possible, while adhering to the inventive concept. Such variations are contemplated as being a part of the present disclosure.

What is claimed is:

1. A maintenance signal flag adapted for use with a shopping cart, the shopping cart is adapted to be pushed by a user, and has a plurality of components comprising wheels which provide mobility, and a basket adapted to receive and hold goods, the basket of the shopping cart has a frame with an exterior portion, the shopping cart is further adapted to be serviced by maintenance personnel, the maintenance signal flag comprising:

a mounting assembly adapted to be secured to the exterior portion of the basket of the shopping cart;

a signal panel and a flag member, whereby the signal panel is attached to the flag member, the signal panel further has a signal panel face and a maintenance message positioned on the signal panel face, the maintenance message identifying one of the components of the shopping cart as defective;

a hinge assembly which pivotally connects the flag member to the mounting assembly, the hinge assembly is adapted to allow the signal flag member to be pivoted by the user between a lowered position and a raised position, whereby the signal panel is raised above the basket of the shopping cart to allow the user to signal to the maintenance personnel that the shopping cart has a maintenance need; and a detachable signal panel hingedly connected to the signal panel, allowing the user to flip the detachable signal panel to either cover or reveal the signal panel face and the maintenance message, the detachable signal panel has an alternate maintenance message identifying another one of the components of the shopping cart as causing the maintenance need, the detachable signal panel is adapted to selectively cover the signal panel face to allow the user to replace the maintenance message with the alternate maintenance message.

2. The maintenance signal flag as described in claim 1, wherein the signal panel has a reflective layer.

3. The maintenance signal flag as described in claim 2, wherein:
   the frame of the basket has a horizontal bar; and
   the mounting assembly has a mounting plate and a locking hook, the mounting assembly is adapted to be secured against the exterior portion of the frame by attaching the mounting plate to the frame and locking the horizontal bar of the frame between the mounting plate and the locking hook.

4. A method for maintaining a shopping cart, the shopping cart having a plurality of components including wheels which provide mobility to the shopping cart and a basket adapted to receive and hold goods, the shopping cart is adapted to be pushed by a user and serviced by maintenance personnel, the method comprising the steps of:
   providing a maintenance signal flag, the maintenance signal flag having a mounting assembly, a flag member, a signal panel attached to the flag member, and a hinge assembly which pivotally connects the flag member to the mounting assembly and is adapted to allow the flag member to pivot between a lowered position and a raised position, the signal panel displaying a maintenance message identifying one of the components of the shopping cart as defective, the maintenance signal flag further has a second signal flag member and a second signal panel attached to the second signal flag member, the second signal panel has an alternate maintenance message identifying another one of the components of the shopping cart which is defective, the second signal flag member is pivotally attached to the hinge assembly, and the hinge assembly is further adapted to be pivoted between the lowered position and the raised position;
   securing the mounting assembly to the shopping cart;
   pivotally placing the flag member in the lowered position;
   approaching the shopping cart by the user, determining the presence of a maintenance need of the shopping cart, and selecting a chosen maintenance message by choosing between the maintenance message or the alternate maintenance message as appropriate to identify the cause of the maintenance need;
   pivotally raising the flag member or the second flag member to the raised position by the user, elevating the signal panel or the second signal panel above the shopping cart to display the chosen maintenance message, and alerting the maintenance personnel to the maintenance need as caused by the component identified by the chosen maintenance message;
   visually spotting the raised maintenance signal flag by the maintenance personnel; and
   servicing the shopping cart by the maintenance personnel, and repairing or replacing the defective component identified by the maintenance signal flag and the chosen maintenance message.

5. A maintenance signal flag adapted for use with a shopping cart, the shopping cart is adapted to be pushed by a user, and has a plurality of components comprising wheels which provide mobility, and a basket adapted to receive and hold goods, the basket of the shopping cart has a frame with an exterior portion, the shopping cart is further adapted to be serviced by maintenance personnel, the maintenance signal flag comprising:
   a mounting assembly adapted to be secured to the exterior portion of the basket of the shopping cart;
   a signal panel and a flag member, whereby the signal panel is attached to the flag member, the signal panel further has a signal panel face and a maintenance message positioned on the signal panel face, the maintenance message identifying one of the components of the shopping cart as defective;
   a hinge assembly which pivotally connects the flag member to the mounting assembly, the hinge assembly is adapted to allow the signal flag member to be pivoted by the user between a lowered position and a raised position, whereby the signal panel is raised above the basket of the shopping cart to allow the user to signal to the maintenance personnel that the shopping cart has a maintenance need; and
   a second signal panel and a second signal flag member, the second signal panel is attached to the second signal flag member and has a second signal panel face, the second signal panel face displaying an alternate maintenance message identifying another one of the components of the shopping cart which is defective, the second signal flag member is pivotally attached to the hinge assembly, and the hinge assembly is further adapted to allow the second signal flag member to be pivoted by the user between the lowered position and the raised position.

6. The maintenance signal flag as described in claim 5, wherein the signal panel has a reflective layer.

7. The maintenance signal flag as described in claim 6, wherein:
   the frame of the basket has a horizontal bar; and
   the mounting assembly has a mounting plate and a locking hook, the mounting assembly is adapted to be secured against the exterior portion of the frame by attaching the mounting plate to the frame and locking the horizontal bar of the frame between the mounting plate and the locking hook.

\* \* \* \* \*